United States Patent
Lau et al.

(10) Patent No.: US 6,839,328 B2
(45) Date of Patent: Jan. 4, 2005

(54) MEASUREMENT OF PACKET LOSS RATIO IN A NETWORK USING END-POINT DATA

(75) Inventors: Richard Lau, Morganville, NJ (US); Arturo Cisneros, Lincroft, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 153 days.

(21) Appl. No.: 10/356,089

(22) Filed: Jan. 31, 2003

(65) Prior Publication Data

US 2004/0151123 A1 Aug. 5, 2004

(51) Int. Cl.[7] .................................................. G01R 31/08
(52) U.S. Cl. ..................................................... 370/252
(58) Field of Search ................................. 370/252, 254, 370/224, 230, 231, 232, 233, 234, 235, 389, 486, 503, 235.1, 236, 239, 241, 333, 395.1, 395.4, 395.41, 395.43, 395.62, 395.64, 395.65, 395.71, 401, 352, 400, 428

(56) References Cited

U.S. PATENT DOCUMENTS 6,504,838 B1 * 1/2003 Kwan .......................... 370/352
6,580,721 B1 * 6/2003 Beshai ......................... 370/428
6,594,268 B1 * 7/2003 Aukia et al. ................. 370/400

* cited by examiner

Primary Examiner—Dang Ton
(74) Attorney, Agent, or Firm—William A. Schoneman (57) ABSTRACT

The packet loss ratio for a network is measured using only end-point packet counter or byte counter data received from ingress and egress network elements, or all edge routers attached to edge network elements in a virtual private network (VPN). After preprocessing the packet count data from the end-points, the data signal is put through a low pass filter of one or more tap sizes to remove high frequency variations in the ingress and egress packet count data due to the inability to sample selected data sets simultaneously. After filtering the data may be integrated in order to increase detection of small amounts of data packet loss. In order to determine if measurable loss has been detected the standard deviation of the signal is calculated over a selected set of data points prior to the window in which the packet loss ratio is calculated. If the detected packet loss is greater than a predetermined detectability threshold based on the computed standard deviation for a target threshold rate for a certain filter size then the loss rate is reported.

29 Claims, 8 Drawing Sheets

MEASUREMENT OF PACKET LOSS RATIO IN A NETWORK USING END-POINT DATA

FIELD OF THE INVENTION

This invention is related to a method and system for the measurement of the packet loss ratio (PLR) in a packet-based network whether an Internet protocol (IP), asynchronous transfer mode (ATM), frame relay (FR) or multi-protocol label switching (MPLS) network or a virtual private network (VPN). End-to-end PLR across multiple administrative domains is measured without requiring information of the transit networks. This is achieved by collecting throughput data only at the ingress/egress or edge of the network. The collected data is processed to extract loss information.

BACKGROUND

In packet-based networks, one measure of the quality of service provided to network users, is the packet loss ratio (PLR). PLR is the ratio of the number data packets lost to the total number of packets transmitted by the user into the network. In ATM it is also referred to as the cell loss ratio. The packet loss ratio (PLR) is one of the basic parameters in service quality and Service Level Agreements (SLA) and is notoriously difficult to measure.

Existing methods of measuring the packet loss ratio either use probes or collect hop-by hop measurement. Probes may be either active or passive. In either case they require the installation of dedicated equipment in strategic locations such as central offices. Such installations are costly. Additional installations are required as the network grows. In other words, the use of probes is not inherently scalable.

The second existing method of measuring packet loss requires the collection of hop-by-hop measurements. This requires detailed topology information and also requires cooperation of intermediate network operators. The packets may traverse networks that are owned by competing entities and one operator may not be willing to provide the hop-by-hop data necessary to measure the PLR.

It would be desirable to have a system and method that can measure the packet loss ratio for a service without requiring the sharing of data between networks or portions of a network.

Further, it would be desirable to have a method and system for measuring the packet loss ratio for a given service that is economical and does require the installation of active or passive probes.

Additionally, it would be desirable to have a system and method that is inherently scalable and does not require the installation of additional probes to be used in ever-larger networks.

Finally, it would be desirable to have a method and system that does not add additional traffic solely for the purpose of measuring packet loss.

SUMMARY

The present invention provides a method and system for measuring packet (cell, data) loss rates in a network without the use of hardware or software probes. The present inventive system and method uses only ingress and egress network element traffic information, such as packet count or byte count for a specific channel. The procedure may also be used in virtual private networks (VPNs). The method and system use data on packet counts or byte counts at the ingress and egress network elements (or at all edge network elements in the case of a VPN). This counter data is preprocessed to complete missing data, calculate differences per collection interval to generate a data difference signal, make corrections for header size variations in the case of byte count data, remove undesirable variations and adjust for network element failure to update counters. Once preprocessed the data difference signal is sent through a low pass filter of one or more tap sizes and may be integrated. The standard deviation of the filtered and/or integrated data within a period of time before a predetermined window is determined. If the data loss rate calculated within the predetermined window is greater than a detectability threshold based on the computed standard deviation then the process has measured a detectable loss within the window. If the loss is measurable the loss rate is reported.

DETAILED DESCRIPTION

Figure 1:
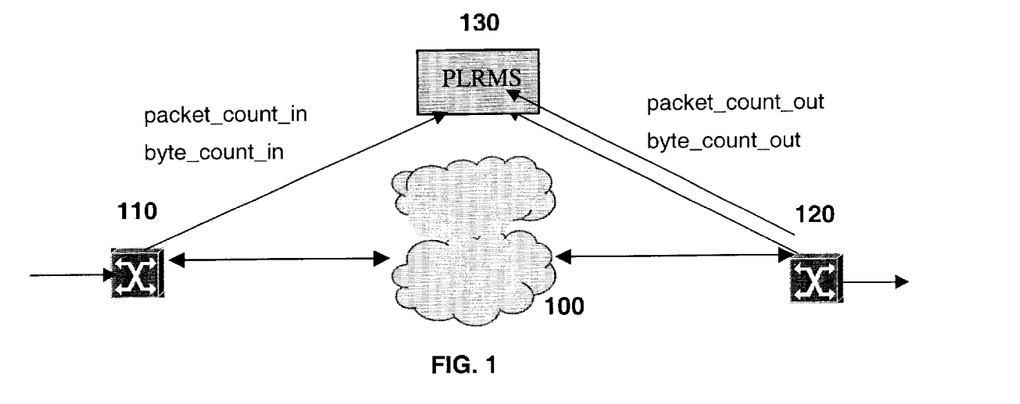
FIG. 1 depicts the present invention integrated into a typical network.

FIG. 1 depicts a typical network in which the packet loss ratio measurement system and method of the present invention can be utilized. Network elements consisting of ingress network element 110 and egress network element 120 are connected to a network 100 that may consist of any number of other network elements. A network element may be any type of packet switch, router, ATM device or other element, which is capable of transmitting packets or bytes of data in the format and protocol specific to the type of network 100 whether it is ATM, IP, FR or MPLS. The packet loss ratio measurement system (PLRMS) 130 contains the novel aspects of the present invention in which the data required to determine the packet loss ratio is sent in order to perform the calculations set forth below. The exact workings of the PLRMS 130 will be described below.

The present invention enables the detection of data loss in the network for a specific channel using only packet count (or byte count) data from the ingress and egress network elements (NEs). Data may travel through any number of other network elements as it is transported across the network but packet loss data may or may not be available from these intermediate network elements or the data collection systems choose to collect edge data only. This disclosure describes the process to determine packet loss in one direction of the communications channel the other direction is treated separately in the same way.

A number of conditions must be met for the present invention to work properly. The packet counts, or byte counts, at the ingress and egress refer to one communication channel where all packets at the ingress must go out at the egress, under no loss conditions. The network must not add any data to the channel, or remove data from the channel. In the case where the network modifies the size of the routing header as packets go through the network, the method of the present invention can correct for header size change and still apply the method to measure user traffic loss in the network. The path the data takes through the network is unimportant, different data packets may even take different routes. It only matters that the ingress and egress points are the same for all user data.

The packet and byte counts are usually sampled at equally spaced intervals at the ingress and egress network elements 110 and 120. The sampling interval may differ depending on the network hardware and software configuration. However, the shorter the collection interval, the processing delay to get a measurement of PLR will be proportionately shorter. A shorter collection interval is clearly more desirable. The sampling interval may be between approximately one minute and approximately ten minutes. A given pair of samples, packet_count_in and packet_count_out, would ideally be taken simultaneously. This, of course cannot be done in practice and the packet counts at the ingress network element 110 and egress network element 120 will be taken at slightly different times. The travel time of data packets from ingress to egress will almost always be much smaller than the time difference is sampling the data at ingress and egress network elements, therefore, the packet travel time through the network can be neglected. The procedure works in any case even if the travel time were comparable with the typical lack of simultaneity in data sampling between ingress and egress NEs. The procedure will also work if the sampling intervals are not equally spaced, but in most networks equally spaced sampling intervals would be used.

Under no loss conditions, all user packets (or bytes) at the ingress network element 110 must be accounted at the output or egress network element 120. Loss in the network can be detected by comparing input and output packet or byte counts during each time period between data samples. However, because exactly the same interval at ingress and egress cannot be measured, there is noise in the data. It is a feature of the present inventive system to eliminate most of the noise in the signal caused by this lack of simultaneity in measurements. The larger the timing difference, the more difficult it will be to detect the smaller loss rates.

The object of the present invention is to determine whether there has been data loss from a particular channel (or a particular VPN) in a network using only measurements at the endpoints. The raw data consists of the values of packet counters at the ingress and egress network elements at approximately equally spaced intervals of time, i.e., the packet_count_in (byte_count_in) and packet_count_out (byte_count_out). This raw data is processed through a preparation procedure as set forth in steps 300–350 of FIGS. 3a and 3b in order to obtain the difference between the number of packets that went into the network and the number of packets that went out of the network during each collection interval, this is shown as Kc(i) in FIG. 2. This signal Kc(i) can be used to detect data loss in the network, it is packets_in minus packets_out per interval. However, because of the lack of simultaneity in reading the raw data from the edge NEs, this signal fluctuates between positive and negative values. The mean of Kc(i) is zero in the case there is no loss in the network because eventually all input packets are accounted for at the output. When there is data loss in the network, the mean of the signal is positive since more packets go in than go out. The size of the upward shift in the mean of Kc(i) is a measure of data loss in the network. The fluctuations in Kc(i) represent noise in the data.

Figure 2:
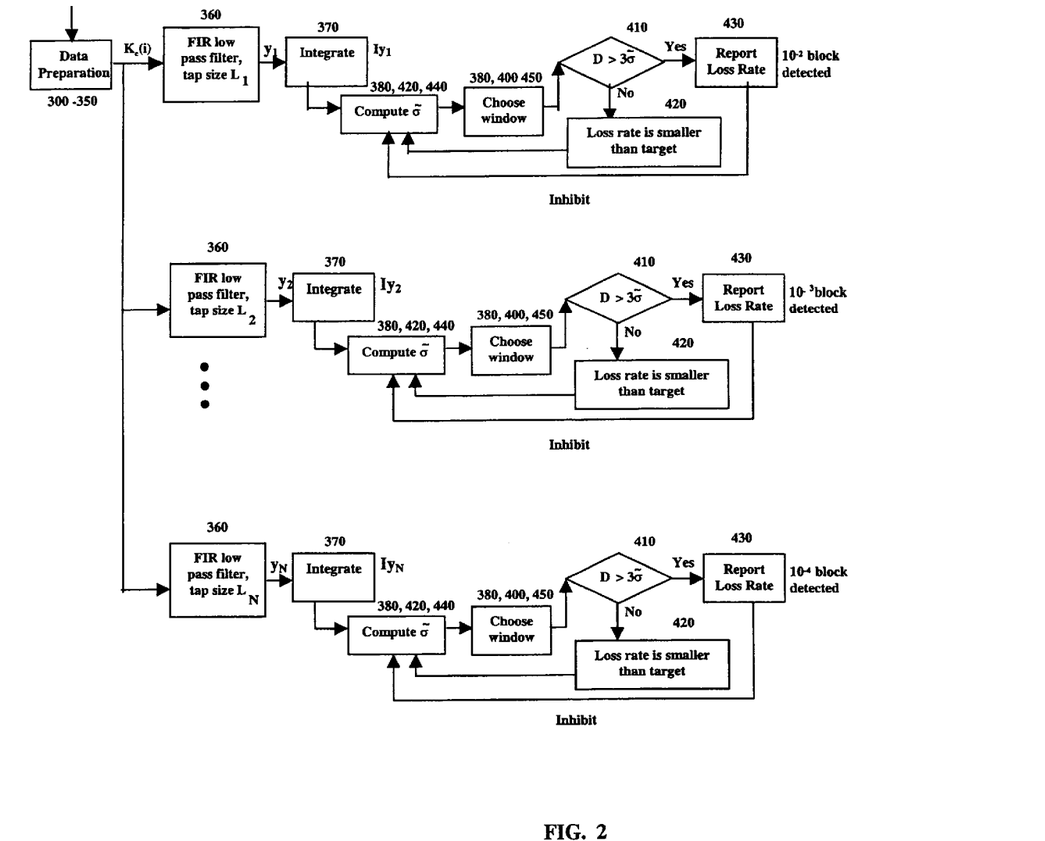
FIG. 2 depicts a simplified flow diagram of the loss ratio measurement process of the present invention using multiple FIR filters on packet data simultaneously.

Because of the noise in the signal, the upward shift in the mean would be detectable only if it is clearly above the noise. The principle of the procedure is to increase detection sensitivity by filtering the data. A low pass FIR filter of tap size N at step 360 reduces the noise in the signal by a factor 1/N. FIG. 2 depicts a simplified version of the flow diagram of FIGS. 3a and 3b using multiple tap sizes N. Reference numerals in FIG. 2 refer to various steps described below with regard to FIGS. 3a and 3b. The filtered signal for each tap size is represented by $y_1, y_2, \ldots y_N$ in FIG. 2. Under no data loss conditions, the signal y also has zero mean and shows an equivalent upward shift when there is data loss in the network.

In order to further increase detection sensitivity, each signal y is integrated at step 370 to obtain the signals $Iy_1$, $Iy_2 \ldots Iy_N$. In the case of a constant loss ratio, y shifts upward by a constant, and during the same period of time, Iy shows a linear growth upward.

From this point, the procedure consists of applying a detectability criterion at step 410 based on the standard deviation of data computed (step 380, 420 or 440) prior to a predetermined window (either a default window set at steps 380 or 450 or chosen window size set at step 400) for a target threshold loss rate. A window is a period of time that covers a number of collection intervals during which the loss rate in the network is being measured. For a given FIR filter and from experience with previously obtained traffic data, it is known what size window is almost always large enough to meet a target threshold loss rate. A threshold loss rate is a value such that if the actual loss rate in the network exceeds it, we must be able to detect it. Typical thresholds are given as $10^{-2}$, $10^{-3}$, etc. The window is moved forward in time as new data becomes available.

The detectability criterion is that the increase in Iy inside the window must be larger than approximately three times the computed standard deviation in the signal Iy. In this case we can measure the loss ratio in the network with approximately 97% confidence level.

The data may be processed in parallel through low pass filters of different tap sizes as shown in FIG. 2. The reason for doing this is that there is a trade-off between delay and lower target threshold for loss rate. A filter of larger tap size will reduce noise by a larger factor and we will be able to detect a lower target loss ratio with it, however the larger tap size means we must wait longer to get a result. It is therefore useful to pass the data through filters of different tap sizes in order to observe the large loss ratios sooner. Small loss ratios require a longer time to detect in any case.

Figure 3A:
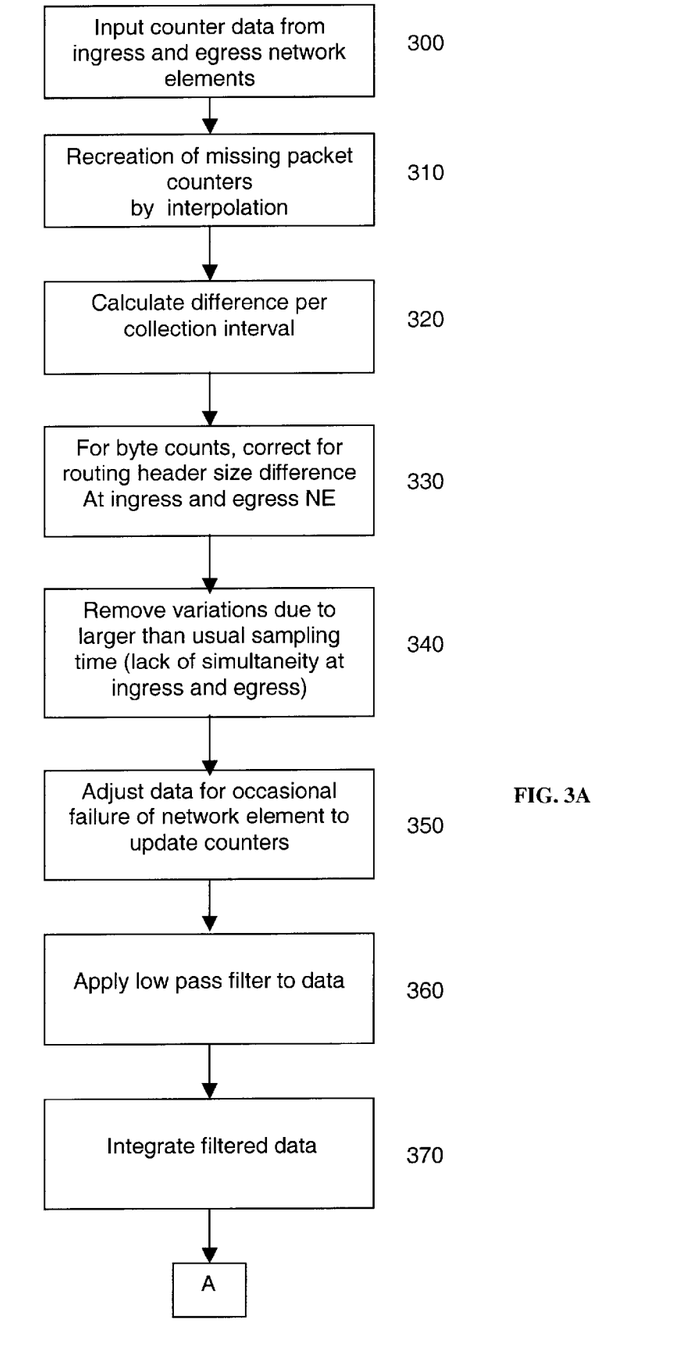
FIGS. 3a and 3b depicts a complete functional block diagram of the loss ratio measurement process.
Figure 3B:
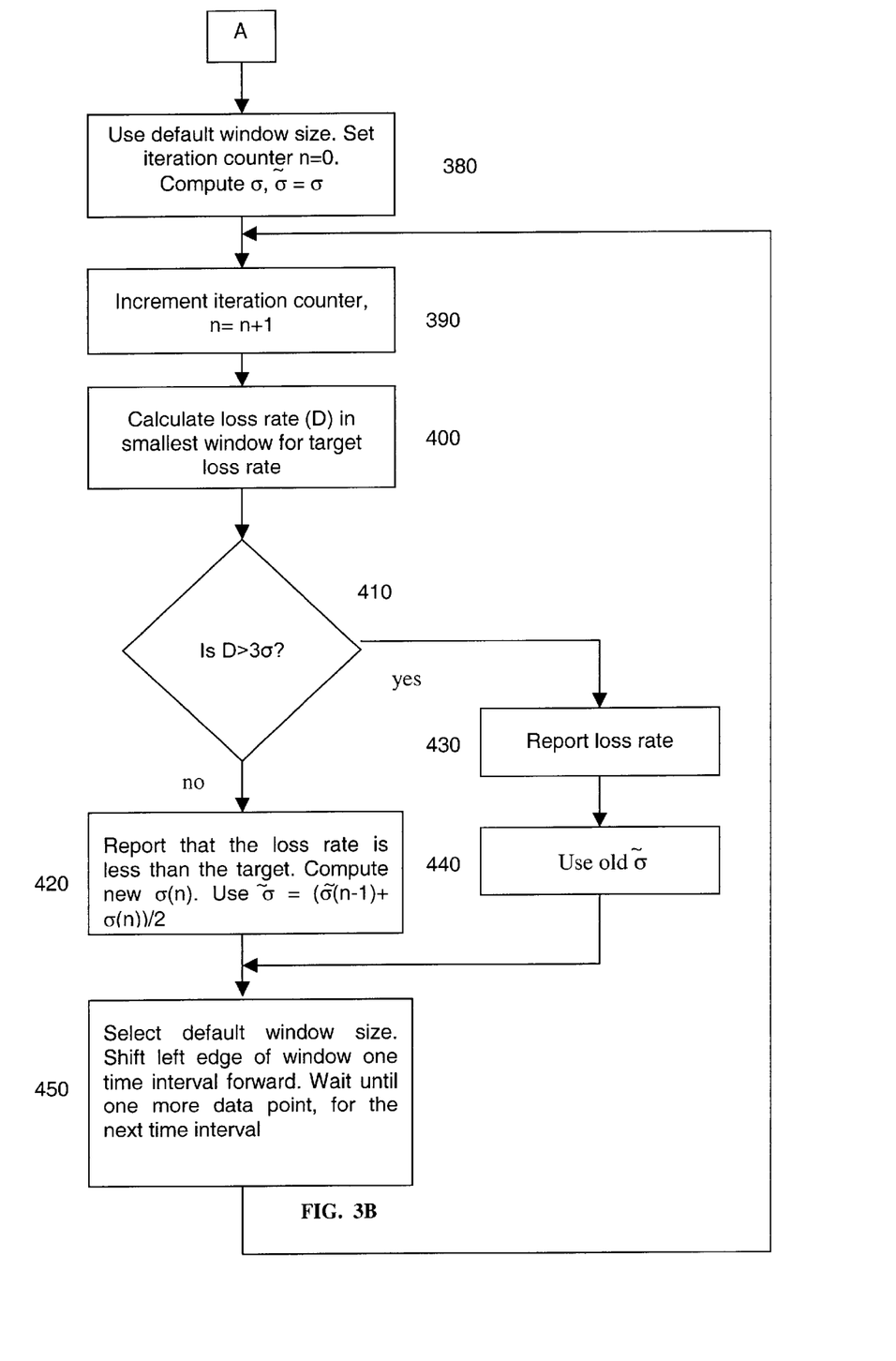

FIGS. 3a and 3b show a functional block diagram of the loss ratio detection process. At step 300 the counter data (i.e., packet_count_in or byte_count_in and packet_count_out or byte_count_out) from the ingress network element 110 and the egress network element 120 are input to the process. Almost all data collection for traffic monitoring from network elements is done at equally spaced time intervals. In our case, the data is referred to as packet counter values or byte counter values in the network elements. Occasionally one, or a few consecutive collection intervals have missing data. Since the counter values are monotonically increasing, the next counter value shows how much the counter incremented over the intervals with missing data and the missing data can be filled in by linear interpolation at step 310. This procedure does not affect the data loss rate computation since the filtering done at step 360 will involve averaging of data in any case. The possibility of counter overflow as a counter reaches its maximum value and starts from zero again must be taken into consideration when doing linear interpolation for missing data. Thirty-two (32) bit counters are assumed as an example, actual counters may be different size and the correction for overflow would be similar.

Looking at one particular counter variable, there should be an uninterrupted sequence (i.e., C(i), C(i+1), C(i+2), C(i+3), . . . ). If C(i+1), C(i+2), . . . C(i+N) are the values that are missing and C(i) and C(i+N+1) are the first and last known values on each side of the missing values then $C_{right}$ can be used as a placeholder value for C(i+N+1) and can be determined using the following sequence of equations (1).

$$C_{right}=C(i+N+1)$$

If $(C(i+N+1)<C(i))$ Then $C_{right}=C(i+N+1)+2^{32}$ and $$C(i+1)=(N*C(i)+C_{right})/(N+1)$$

$$C(i+2)=((N-1)*C(i)+2*C_{right})/(N+1)$$

$$C(i+3)=((N-2)*C(i)+3*C_{right})/(N+1)$$

. . .

$$C(i+N)=(C(i)+N*C_{right})/(N+1) \quad (1)$$

The addition of $2^{32}$ corrects for the situation where the counter has overflowed and has continued counting at the lowest counter number again. This technique is applied in various equations below to correct for counter overflow.

Once any missing data has been replaced at step 310, the difference calculation per collection interval is performed at step 320. In order to simplify the discussion, reference to packet counts also applies to byte counts or to other ways of measuring data. If $C_{in}(i)$=packet count at ingress NE 110 at sample time i and $C_{out}(i)$=packet count at egress NE 120 at sample time i, then using the following set of equations (2) and (3) the packet differences may be obtained as follows.

$$\text{Diff\_In}(i+1)=C_{in}(i+1)-C_{in}(i)$$

If $(C_{in}(i+1)<C_{in}(i))$ Then $\text{Diff\_In}(i+1)=\text{Diff\_In}(i+1)+2^{32}$ (2)

$$\text{Diff\_Out}(i+1)=C_{out}(i+1)-C_{out}(i)$$

If $(C_{out}(i+1)<C_{out}(i))$ Then $\text{Diff\_Out}(i+1)=\text{Diff\_Out}(i+1)+2^{32}$ (3)

Diff_In(i+1) is the number of user packets going into the ingress NE from time i to time i+1. Diff_Out(i+1) is the number of user packets going out of the egress NE from time i to time i+1.

A 32-bit counter is being assumed in this example, although counter size could vary depending on the network element. Again, the addition of $2^{32}$ compensates for counter overflow.

At step 320 the number of packets into the network minus packets out of the network for each interval is calculated as the difference between Diff_In(i+1) and Diff_Out(i+1), i.e., the difference between the number of packets that went into the network and the number of packets that went out of the network form time i to time i+1 as in equation (4).

$$K(i+1)=[\text{Diff\_In}(i+1)-\text{Diff\_Out}(i+1)] \quad (4)$$

Because of the sampling time inaccuracy, even under no loss conditions K(i) will not be zero but will take on positive and negative values. However, under no loss conditions, every packet at the input eventually gets accounted at the output, so under no loss K(i) is a random variable with zero mean. A shift in the mean of K(i) toward a positive value indicates loss of data in the network. The random fluctuations in K(i) make it difficult or impossible to measure small data loss ratios because the upward shift in the mean is small compared to fluctuations in the signal, for the loss ratio sizes we are trying to measure. The loss ratio is defined as the amount of data lost divided by the data sent into the network by the user in a given period of time.

If byte counts (rather than packet counts) are being used, step 330 must be invoked. This is the only step that is specific to byte counts. In some cases it may not be possible to get packet counts at both the ingress network element 110 and egress network element 120. Data packets at ingress and egress NEs may have different routing header size and the NEs report a byte count that includes user data and header. So even when there is no data loss in the network, the difference of bytes counted at the ingress and egress do not average to zero. This difference in header size can be accounted for because the number of bytes difference is a constant per packet. First the number of packets per interval must be computed per interval using the set of equations (5).

$$P(i+1)=[C_p(i+1)-C_p(i)]$$

If$(C_p(i+1)<C_p(i))$ Then $P(i+1)=P(i+1)+2^{32}$ (5)

$C_p$ (i) is the packet count at ingress NE (or at egress NE) at sample time i. $C_p$ (i+1)=packet count at the ingress NE (or at egress NE) at sample time i+1. A 32 bit counter is being assumed in this example.

The number of bytes per packet removed or added per packet is calculated with the following equation (6).

$$b = \text{Round}\left(\left(\sum_{i=1}^{i=N} K(i)\right) \Big/ \left(\sum_{i=1}^{i=N} P(i)\right)\right) \quad (6)$$

A typical value for N would be about 15 to 20. The "Round" function in the above formula is rounding to the nearest integer. The corrected bytes-in minus bytes out is determined by equation (7).

$$K_{new}(i)=[K(i)-b*P(i)] \quad (7)$$

Step 340 is performed whether byte data or packet data are being used and it consists of the removal of large variations in the data due to the occasional larger than usual sampling time, i.e., a lack of simultaneity at ingress and egress. Step 340 consists of the following algorithm.

```
IF ((ABS (K(i-1)) < 2*TH) & (K(i) > 3*TH) & (-K(i+1) > 3*TH))
    New = (K(i)+K(i+1))/2;
    K_c(i) = New;
    K_c(i+1) = New;
ELSEIF ((ABS(K(i-1)) < 2*TH) & (-K(i) > 3*TH) & (K(i+1) > 3*TH))
    New = (K(i)+K(i+1))/2;
    K_c(i) = New;
    K_c(i+1) = New;
ELSE
    K_c(i) = K(i);
END
```

Variable "TH" is the threshold value or the standard deviation (σ) of K(i) calculated in accordance with equation (8) below. $K_c$ is the corrected packet difference.

$$\sigma = \sqrt{\sum_{i=r}^{i=m} (K(i)-\mu)^2/(m-r)} \quad (8)$$

The value for "$\mu$" is calculated in accordance with equation (9) below.

$$\mu = \sum_{i=r}^{i=m} K(i)/(m-r+1) \quad (9)$$

The standard deviation computed above is taken over a number of collection intervals (m−r+1) that would typically be about 10. The latest K(m) in this set is just before the time interval (i−1) so that m=i−2.

Occasionally network elements such as routers become congested and the router processor fails to increment traffic counters even when traffic has gone through the router. If for any i the absolute value of $K_c(i)$ is larger than 10% of the average of the six nearby total input packet counts and also larger than three times the average of the five nearby $K_c(i)$ values, it will be assumed that it is due to counter update failure. $K_c(i)$ will be replaced in this case by the average of the other five nearby $K_c(i)$ values. If a change is made, the sign (positive or negative of $K_c(i)$ is maintained. This is accomplished at step 350 of FIG. 3a.

It is necessary to compute first the number of input (or output) packets per interval as set forth in the following set of equations (10).

$$B(i+1)=[C_{in}(i+1)-C_{in}(i)]$$

$$\text{If}(C_{in}(i+1)<C_{in}(i)) \text{ Then } B(i+1)=B(i+1)+2^{32} \quad (10)$$

$C_{in}(i)$ is the packet count at ingress NE 110 at sample time i. $C_{in}(i+1)$=packet count at ingress NE 110 at sample time i+1. B(i+1)=total input packets between time i and (i−1). At this step the following algorithm is used.

If {(ABS(Kc(i))>(0.1*(B(i−3)+B (i−2)+B(i−1)+B(i)+B (i+1)+B(i+2))/6) AND ((ABS(Kc (i))>3*(Kc(i−3)+Kc (i−2)+Kc(i−1)+Kc (i+1)+Kc(i+2))/5)}

Then

Kc(i)=(sign of Kc(i))ABS(Kc (i−3)+Kc(i−2)+Kc (i−1)+Kc(i+1)+Kc (i+2))/5

Else

Kc(i)=Kc(i)

In order to simplify the notation, from this point K(i) will be used to refer to the result of passing the data through steps 310 to 350. The basic principle of the method of the present invention for detecting small loss ratios is to use digital signal processing techniques to reduce the noise in the signal (i.e., the fluctuation in the K(i)). K(i) can be considered as a digital signal. As such fluctuations in K(i) have a period of variation of the order of one, i.e, K is changing significantly from one sample to the next. This is the high frequency component of the fluctuations and most of the fluctuation is at the high frequency side of the spectrum of the signal. The application of a low pass digital filter to K(i) will greatly reduce the high frequency noise allowing us to more easily detect an upward shift in the mean, the mean of the filtered signal will shift by the same amount as the unfiltered signal.

At step 360 a FIR filter of length L is applied as the low pass filter. The general structure of a FIR filter is given by equation (11) where K(n) is the input sample and h(m) are the weights of the FIR filter.

$$y(n) = \sum_{m=0}^{L-1} K(n-m)*h(m) \quad (11)$$

$$= K(n)h(0)+K(n-1)h(1)+\ldots+K(n-L+1)h(L-1)$$

For example, a simple case of a low pass filter that is the moving average FIR with all the weights equal to 1/L equation (11) simplifies to equation (12).

$$y(n)=(1/L)*\{K(n)+K(n-1)+\ldots+K(n-N+1)\} \quad (12)$$

For example, if L is 6 then equation 12 becomes equation (13) below.

$$y(n)=(1/6)*\{K(n)+K(n-1)+K(n-2)+K(n-3)+K(n-4)+K(n-5)\} \quad (13)$$

The choice of L depends on the tradeoff between degree of smoothing and processing delay. The larger L is, the greater the reduction in the noise but the longer it will take to get a result because more K(i) samples are needed. Another example of a low pass filter is the concatenation of two moving average FIR filters. That is applying one averaging filter and then again another averaging filter to the result of applying the first filter. For example, using the concatenation of two L=3 moving average filters and starting with signals k(i), (i.e., k(1), k(2), k(3), . . . ) the first filter can be applied to get the intermediate sequence z(i), i.e., z(3)=(1/3)(k(3)+k(2)+k(1)), z(4)=(1/3)(k(4)+k(3)+k(2)), z(5)=(1/3)(k(5)+k(4)+k(3)) . . .

Next the second filter is applied to z(i) to get the sequence y(i), i.e., y(5)=(1/3)(z(5)+z(4)+z(2))=(1/9)(k(5)+2k(4)+3k(3)+2k(2)+k(1)), y(6)=(1/3)(z(6)+z(5)+z(3))=(1/9)(k(6)+2k(5)+3k(4)+2k(3)+k(2)), y(7)= . . . .

Therefore, concatenating two moving average L=3 filters is equivalent to applying one L=5 filter with coefficients h( ): 1/9, 2/9, 3/9, 2/9, 1/9. For example, a different (from the above) L=5 filter would be the moving average L=5 filter which has coefficients h( ): 1/5, 1/5, 1/5, 1/5, 1/5.

The data may be processed in parallel (simultaneously) through more than one low pass filter. As depicted in FIG. 2 a plurality of N different tap sizes could be used. Steps 370 through 460 would be performed for each of these parallel processes. A filter with larger tap size involves a longer processing delay but can detect smaller loss ratios. The reason for using filters of different tap sizes is to be able to detect the larger loss ratios sooner.

At step 370 the integration of the filtered data occurs. As stated before, an upward shift in the mean of K(i) (or y(i)) indicates data loss. The loss is further easier to detect if y(i) is integrated as in equation (14). If the mean of y(i) shifts upward from zero, then I(j) will ramp upward as it represents the area under the y(i) graph.

$$I(j) = \sum_{i=1}^{j} y(i) \qquad (14)$$

Figure 4:
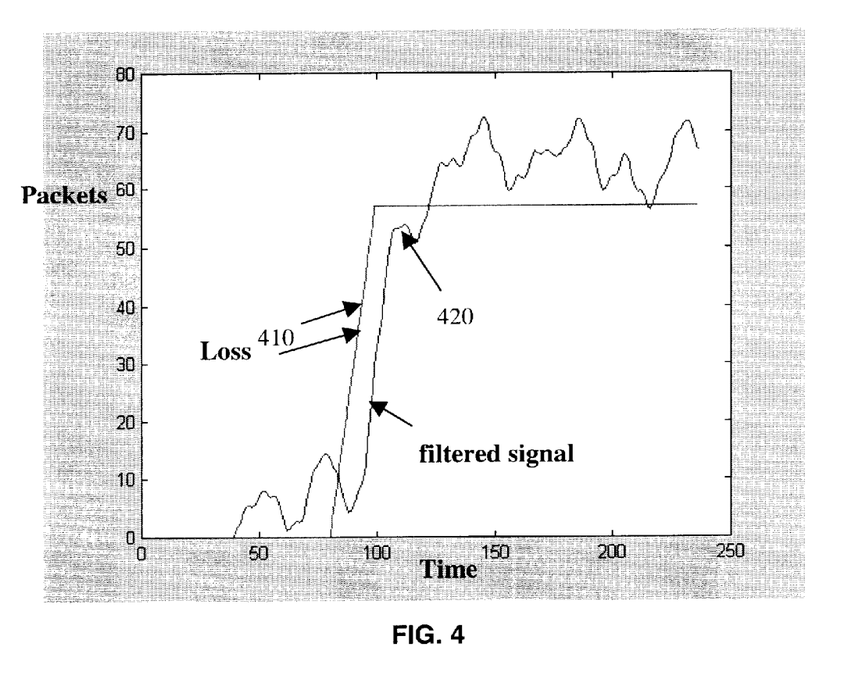
FIG. 4 depicts a plot of the integrated signal I(j) for a sample of data collected from network elements.

FIG. 4 shows a plot of the integrated signal I(j) 420 for a sample of data collected from routers. Superimposed on the signal is some data loss 410 that causes the signal to ramp upward. It is the upward displacement of I(j) that we are trying to measure. It must be discriminated from the noise in the signal as seen in the fluctuations of I(j) 420 in FIG. 4.

At step 380 the window size is set to the default window size, the iteration counter is set to zero (n=0) and the standard deviation σ is computed. A window is a time interval over an integer number of collection intervals during which it is desired to measure the packet loss ratio. This is associated with a number of samples of the digital signal I(j). From sample time i=a to sample time i=z, the window is of size w=z−a+1. It is necessary to use various widow sizes, other than one collection interval or window size one, because smaller loss rates can only be detected over longer periods of time, after the signal has increased above the noise. A default window size is selected from experience with data from NEs. The default widow size depends on the low pass filter being used, on the degree of simultaneity of the measurements at the NEs, and on the characteristics of the traffic. The default window size is chosen so that the detectability test in step 410 is usually satisfied and it is not necessary to use a larger window in order to meet a target loss rate.

An iteration counter, n, is used to count the number of times the algorithm loop described below has been executed. After each iteration the left edge of the detection window is shifted one collection interval to the right (ahead in time).

The standard deviation is given by equation (15) with "$\mu$" defined by equation (16).

$$\sigma = \sqrt{\sum_{j=r}^{j=m} (I(j) - \mu)^2 / (m-r)} \qquad (15)$$

$$\mu = \sum_{j=r}^{j=m} I(j)/(m-r+1) \qquad (16)$$

In the above, m is the time value just before left edge of the window (m=a−1) and r is the value of the left edge of the window minus 15 (for example). The smaller the number of data points I(j) that are used to compute σ, the larger will be the probability that the computed σ being off the true value by an unacceptable amount. Approximately ten or more data points are needed for the detectability criterion below to apply with 97% confidence level. Finally, at step 380 set σ=σ. Note that this σ is used only for default initialization of σ. The subsequent updates of σ are done at step 420. Note that the standard deviation is not calculated in the window in which the loss ratio is measured but rather is calculated using a number of data points to the left of (i.e., prior in time to) the window.

At step 390 the iteration counter is incremented. At step 400 the smallest window that meets the target loss rate is chosen. In order to measure a specified target loss rate T ($10^{-2}$, $10^{-3}$, etc. for example), the number of packets lost in the window would be TwM, where wM is the total number of packets that went into the network during the window and M is the average number of packets into the network per collection interval in the window. For the amount of loss TwM to be detectable it must be larger that three times the computed standard deviation of I(j) or TwM>3σ. The window size must be the smallest that satisfies the target rate condition, a larger window would clearly satisfy the inequality but would lead to greater delay in obtaining a loss rate measurement. With the packet count from time a to time z given by Diff_In(a)+Diff_In(a+1)+ . . . +Diff_In(z)=wM then the smallest window that satisfies $$w > \frac{3\tilde{\sigma}}{MT}$$

is selected.

The period over which the standard deviation is to be computed must be large enough to be representative of the I(j) signal but not too long to delay the measurement process. For example, the previous 10 or 15 values of I(j) may be used. The sample of I(j) over which σ is computed must be a continuous stretch over which no loss was detectable. Data loss shifts I(j) upward and would skew the value of σ. This is why the previous σ is used at step 440.

At step 410 a detectability test is applied inside the window to determine if the loss is properly measurable inside the selected window. During the period of time of the window (a to z), the total number of packets into the network minus the total number of packets out is set forth in equation (17).

$$D=I(z)-I(a-1)=y(a)+y(a+1)+ \ldots +y(z) \qquad (17)$$

This measures the number of packets assumed to be lost. However to have a degree of confidence that the presumed loss is not due to a statistical fluctuation, it is required that D be larger than three times the computed standard deviation of the signal I(j) over a period up to the time i=a−1. This requirement is the detectability criterion or threshold. Thus, there is a loss detection if D>3σ.

If the loss detectability criterion is not met, i.e., D<3σ, then the process branches to step 420. At step 420, the loss rate is reported as less that the target T used with this specific FIR filter and a new standard deviation is computed using the same used in step 380 over the latest stretch of data for which there is no loss and take the average with the previous σ.

That is, the following equation (18) is used.

$$\sigma=(\sigma(n-1)+\sigma(n))/2 \qquad (18)$$

The reason for averaging over the previous value of σ is that it acts as a filter to eliminate fluctuations in the standard deviation from sampling error.

In the case the detectability criterion is met, i.e., D>3σ then at step 430 the detectable loss rate measurement is used to determine and report the value of the loss rate per equation (19). It is the measured data loss in the window divided by the input data in the window.

$$LR=D/(wM) \qquad (19)$$

When loss is properly measurable, the previously calculated standard deviation σ is used at step 440 because the loss would skew σ to a larger value for reasons unrelated to the statistical noise in the signal, thus σ=σ(n−1).

Step 450 is arrived at from either step 420 or 440. The left edge of the window is moved one time interval to the right, i.e., replace a by a+1. The default window size, as discussed in block 380 is selected. If one more data point is not yet available, the process waits until it becomes available from the preprocessing steps 410 to 480 and the procedure is repeated by returning to step 390 where the iteration counter is incremented.

Figure 5:
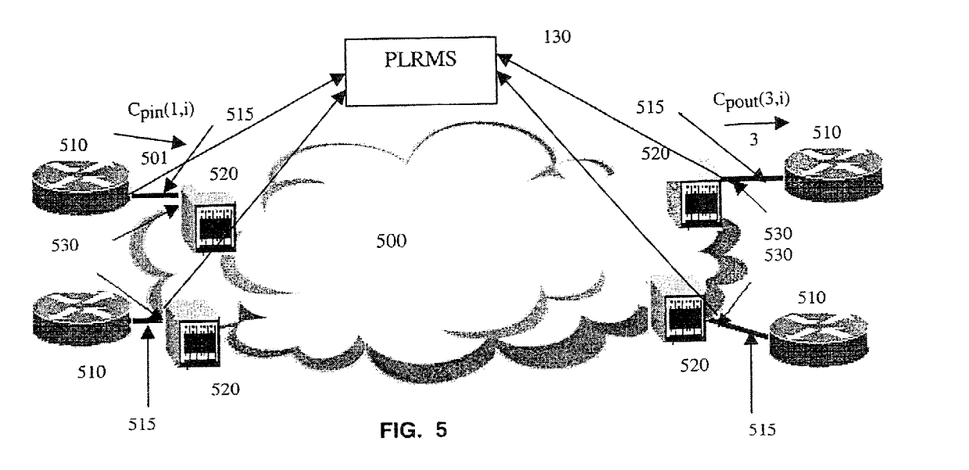
FIG. 5 depicts the present invention integrated into a virtual private network.

In a virtual private network (VPN) 500 there are a plurality of customer premises equipment (CPE) 510 as shown in FIG. 5. The CPE 510 are connected by a link 515 to an interface on the edge network elements 520 (which can be NEs other than routers). It is desired to measure the data loss rate in the network that originated from the VPN. It is assumed that at each edge network element the amount of data going into the network and the amount of data leaving the network can be measured. In a VPN, traffic from any site may be distributed to any of the other sites. It is assumed that only endpoint data is available. The loss ratio for the entire VPN can be determined using the same procedure used for the point to point case by aggregating the traffic into the network over all VPN edge links and aggregating the traffic out of the network over all VPN edge links. The process will apply only to non-multicast VPNs.

Assuming that the following measurements have been taken at access interfaces 530, for equally spaced time intervals labeled by i and sent to PLRMS 130. $C_{pin}(j,i)$ is the input packet count at time i for access interface j, (j=1, 2, ..., M). $C_{pout}(j,i)$ is the output packet count at time i for access interface j, (j=1, 2, ..., M). This will produce two time sequences for each interface j—($C_{pin}(j,1)$, $C_{pin}(j,2)$, $C_{pin}(j,3)$, ...) and ($C_{pout}(j,1)$, $C_{pout}(j,2)$, $C_{pout}(j,3)$, ...). This data is used at the input step 600 of FIG. 6. As in the point-to-point case of FIGS. 3a and 3b, at step 610 the missing data is filled in by linear interpolation as step 310 of the flowchart of FIG. 3a.

Figure 6:
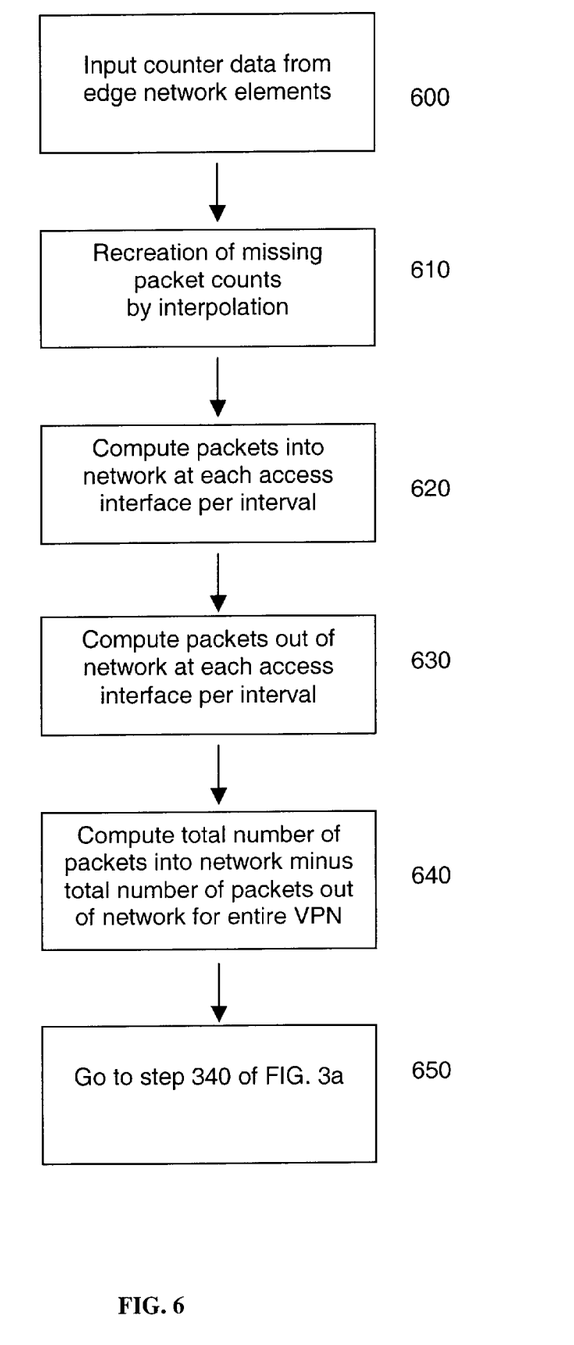
FIG. 6 depicts a flow diagram of the preprocessing necessary for packet (byte) count data from a virtual private network; and, FIG. 7 depicts a schematic diagram of the packet loss ratio measurement system of the present invention.

At step 620 the packets into the VPN network at each access interface (j) 530 are determined in accordance with equations (20) and (21).

$$P_{in}(j,i+1) = [C_{pin}(j,i+1) - C_{pin}(j,i)] \quad (20)$$

$$\text{If}(C_{pin}(j,i+1) < C_{pin}(j,i)) \text{ Then } P_{in}(j,i+1) = P_{in}(j,i+1) + 2^{32} \quad (21)$$

$C_{pin}(j,i)$ is the input packet counter value at access interface j at sample time i. $C_{pin}(j,i+1)$=input packet counter value at access interface j at sample time i+1.

$P_{in}(j,i+1)$=number of packets into access interface j between time i and (i+1). A 32-bit counter is being assumed in this example.

At step 630 the packets out of the network at each access interface j are computed in accordance with equations (22) and (23).

$$P_{out}(j,i+1) = [C_{pout}(j,i+1) - C_{pout}(j,i)] \quad (22)$$

$$\text{If}(C_{pout}(j,i+1) < C_{pout}(j,i)) \text{ Then } P_{out}(j,i\ 1) = P_{out}(j,i+1) + 2^{32} \quad (23)$$

$C_{pout}(j,i)$ is the output packet counter value at access interface j at sample time i. $C_{pout}(j,i+1)$ is the output packet counter value at access interface j at sample time i+1. $P_{out}(j,i+1)$ is the number of packets leaving access interface j between time i and (i+1). A 32-bit counter is being assumed in this example.

At step 640 the total number of packets for the VPN into the network minus the number of packets out of the network from time i to time i+1 is computed using formula (24).

$$K_P(i+1) = \sum_{j=1}^{M} P_{in}(j, i+1) - \sum_{j=1}^{M} P_{out}(j, i+1) \quad (24)$$

$K_p(i)$ is now used in the process depicted in flowchart of FIGS. 3a and 3b, in the same way as K(i), in order to measure data loss in a VPN. The $K_p(i)$ data is used by the process starting at step 340 of FIG. 3a in order to determine the loss ration in the VPN case.

There are a number of simplifications and variations in this method for measuring data loss ratio in networks. Step 330 is not necessary where packet counts rather than byte counts are used. It is not needed when it is known that the packet size in terms of the number of bytes is the same at the ingress and egress measurement points.

Only one low pass filter may be used as a simplification of the method. This may increase the amount of time the process requires to properly measure detectable loss, but it reduces the overall complexity.

Step 370 may be excluded as a simplification. In this case the standard deviation is calculated using the K sequence instead of the I sequence. It has been found experimentally, that the standard deviation of the K sequence is about half of that of the I sequence. For this reason, the integration of step 370 is skipped, the detectability criterion in used in step 410 must be changed to D>6σ.

Figure 7:
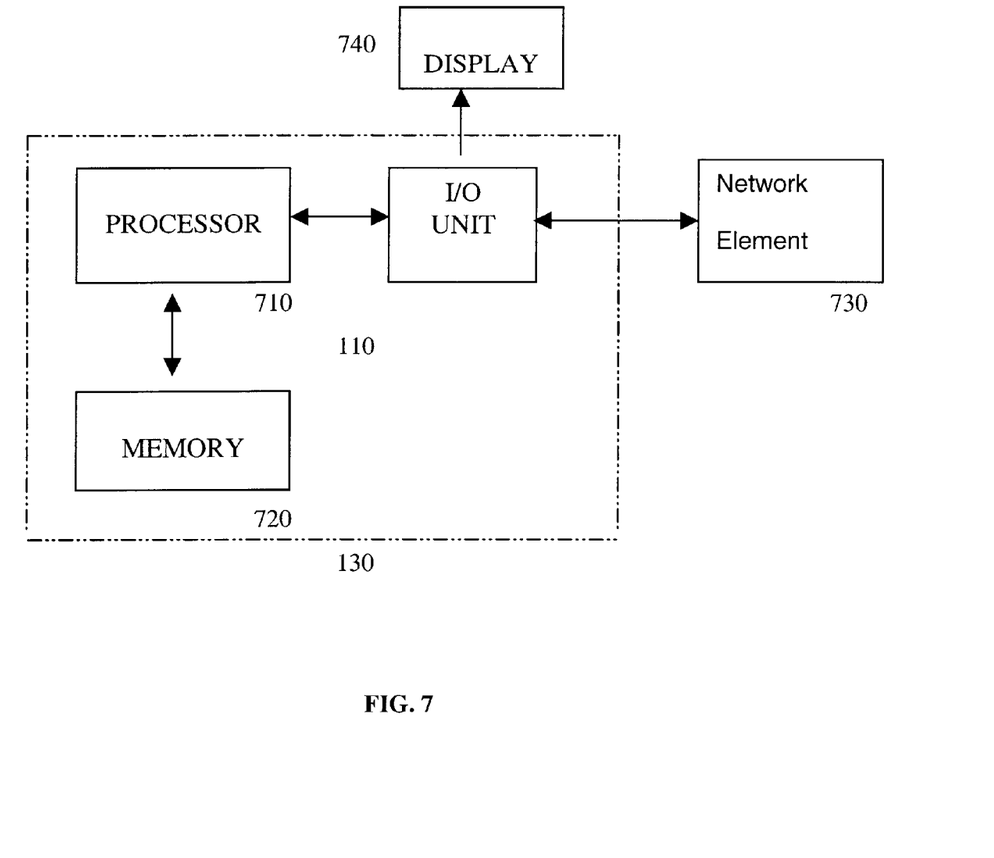

A fixed window size can be used as a simplification of the method. In this case, if loss is not measurable at the end of step 410, the process skips to step 450. FIG. 7 depicts a schematic diagram of a PLR measurement system 130 in accordance with the present invention. Processor 710 is a central processing unit such as that found in a personal computer, workstation, minicomputer or other general-purpose computer. Processor 710 is connected to memory 720 and input/output unit 730. Processor 710 is capable of executing computer program instructions compiled or translated from a variety of programming languages. Memory 720 stores the computer program capable of implementing the equations and algorithms described above in addition to packet count data or byte data received from ingress network element 110, egress network element 120 or, in the case of a VPN, the different edge network elements 510 at edge routers 520. Input/output unit 730 enables the processor 710 to receive packet or byte count data from one or more network elements such as an ingress network element 110 and to display to a user the calculated packet loss ration on display 740.

Counter data may be obtained from the network elements in various ways, which are well established in the network services industry. For example, the networks elements are connected by an internal internetwork or equivalent internal communications system. The network elements sample the data at the predetermined times and send their data files to a central location. Alternatively, the networks elements are connected by an internal internetwork or equivalent internal communications system. A central computer sends requests (by SNMP for example) to the network elements for them to respond with the data. Large network services providers already have operations support systems that can collect the data needed for this method of determining loss rate.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

We claim:

1. A method for measuring data loss rate in a network having an ingress network element and an egress network element comprising the steps of:

inputting counter data measuring the data count into the network at the ingress network element;

inputting counter data measuring the data count out of the network at the egress network element;

calculating the difference between the data count into the network and the data count out of the network for each of a plurality of predetermined intervals to generate a data difference signal;

applying a low pass filter to the data difference signal to generate a filtered data difference signal;

calculating the standard deviation of the filtered data difference signal using data immediately prior to a predetermined window;

calculating the data loss rate based on the filtered data difference signal in the predetermined window; and, reporting the data loss rate if the data loss rate exceeds a predetermined detectability threshold based on the computed standard deviation of the filtered difference signal.

2. The method of claim 1 further comprising the step of integrating the filtered data signal prior to calculating the standard deviation of the filtered signal.

3. The method of claim 1 further comprising the recreation of missing data counts through interpolation prior to calculating the difference between the data count into the network and the data count out of the network.

4. The method of claim 1 further comprising, prior to applying the filter, the step of correcting the data count due to routing header size differences at the ingress network element and the egress network element due to the use of byte count data.

5. The method of claim 1 further comprising, prior to applying the filter, the step of removing variations in the data counts due to larger than usual sampling times at the ingress or egress network elements.

6. The method of claim 1 further comprising, prior to the applying the filter, the step of adjusting the data counts if the network elements failed to properly update its internal counters.

7. The method of claim 1 wherein the predetermined detectability threshold is approximately six times the computed standard deviation of the filtered difference data signal.

8. The method of claim 2 wherein the predetermined detect ability threshold is approximately three times the computed standard deviation of the filtered and integrated difference data signal.

9. The method of claim 1 further comprising the steps of:

reporting that the data loss is less than the predetermined detectability threshold;

calculating a new computed standard deviation for the filtered data difference signal based on the moving average of the last two computed standard deviations;

shifting the predetermined window forward in time by one interval; and, repeating the above steps until the predetermined detectability threshold is exceeded.

10. The method of claim 1 further comprising applying an additional plurality of low pass filters having different tap sizes and performing each of the subsequent steps on the respective filtered difference signals in parallel.

11. The method of claim 1 wherein the size of the predetermined window is based on the desired target loss rate and the computed standard deviation of the filtered data difference signal.

12. A method for measuring data loss in a virtual private network having a plurality of edge network elements comprising the steps of:

inputting counter data from each edge network element;

computing the amount of data into the network at each edge network element and the amount of data out of the network at each edge network element from the counter data for a plurality of predetermined intervals;

calculating the difference between the total amount of data into the network and the total amount of data count out of the network for each of the predetermined intervals to generate a data difference signal;

applying a low pass filter to the data difference signal to generate a filtered data difference signal;

calculating the standard deviation of the filtered data difference signal using data immediately prior to a predetermined window;

calculating the data loss rate based on the filtered data difference signal in the predetermined window; and, reporting the data loss rate if the data loss rate exceeds a predetermined detectability threshold based on the computed standard deviation of the filtered difference signal.

13. The method of claim 12 further comprising the step of integrating the filtered data signal prior to calculating the computed standard deviation of the filtered data signal.

14. The method of claim 12 further comprising the recreation of missing data counts through interpolation prior to calculating the difference between the total amount of data into the network and the total amount of data out of the network.

15. The method of claim 12 further comprising, prior to applying the filter, the step of removing variations in the data counts due to larger than usual sampling times at one or more edge network elements.

16. The method of claim 12 further comprising, prior to the applying the filter, the step of adjusting the data counts if one or more edge network elements failed to properly update an internal counters.

17. The method of claim 12 wherein the predetermined detectability threshold is approximately six times the computed standard deviation of the filtered data difference signal.

18. The method of claim 13 wherein the predetermined detectability threshold is approximately three times the computed standard deviation of the filtered and integrated data difference signal.

19. The method of claim 12 further comprising the steps of:

reporting that the data loss is less than the predetermined threshold;

calculating a new computed standard deviation for the filtered data difference signal based on and average of the last two computed standard deviations;

shifting the predetermined window forward in time by one interval; and, repeating the above steps until the predetermined detectability threshold is exceeded.

20. The method of claim 12 further comprising applying an additional plurality of low pass filters having different tap sizes and performing each of the subsequent steps on the respective filtered difference signals in parallel.

21. A system for measuring the data loss rate in a network having an ingress network element and an egress network element comprising:

means for inputting counter data measuring the data count into the network at the ingress network element and the data count out of the network at the egress network element;

means for calculating the difference between the data count into the network and the data count out of the network for each of a plurality of predetermined intervals to generate a data difference signal;

means for applying a low pass filter to the data difference signal to generate a filtered data difference signal;

means for calculating the standard deviation of the filtered data difference signal over a set of data point immediately prior to a predetermined window;

means for calculating the data loss rate based on the data difference signal in the predetermined window; and, means for reporting the data loss rate if the data loss exceeds a predetermined detectability threshold based on the computed standard deviation of the filtered difference signal.

22. The system of claim 21 further comprising means for integrating the filtered data signal prior to calculating the standard deviation of the data difference signal.

23. The system of claim 21 further comprising means for the recreation of missing data counts through interpolation prior to calculating the difference between the data count into the network and the data count out of the network.

24. The system of claim 21 further comprising means for correcting the data count due to routing header size differences at the ingress network element and the egress network element due to the use of byte count data.

25. The system of claim 21 further comprising means for removing variations in the data counts due to larger than usual sampling times at the ingress or egress network elements.

26. The system of claim 21 further comprising means for adjusting the data counts if the network elements failed to properly update its internal counters.

27. The system of claim 21 wherein the predetermined detectability threshold is approximately six times the computed standard deviation of the filtered data difference signal.

28. The system of claim 22 wherein the predetermined detectability threshold is approximately three times the computed standard deviation of the filtered and integrated data difference signal.

29. The system of claim 21 further comprising:

means for reporting that the data loss is less than the predetermined threshold;

means for computing a new standard deviation for the filtered data difference signal based on the moving average of the last two computed standard deviations; and, means for shifting the predetermined window forward in time by one interval.

* * * * *